US012694873B1

(12) United States Patent
Lyle et al.

(10) Patent No.: US 12,694,873 B1
(45) Date of Patent: Jul. 28, 2026

(54) DEVICE WITH INTELLIGENT VOICE SYSTEM FOR TEMPORARY MANAGEMENT OF CONTENT

(71) Applicant: UIPCO, LLC, San Antonio, TX (US)

(72) Inventors: Ruthie D. Lyle, Durham, NC (US);
Bharat Prasad, San Antonio, TX (US);
Ravi Durairaj, San Antonio, TX (US);
Nolan Serrao, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 287 days.

(21) Appl. No.: 18/483,682

(22) Filed: Oct. 10, 2023

Related U.S. Application Data

(63) Continuation-in-part of application No. 16/928,060, filed on Jul. 14, 2020, now abandoned.

(60) Provisional application No. 62/878,836, filed on Jul. 26, 2019.

(51) Int. Cl.
*G10L 15/22* (2006.01)

(52) U.S. Cl.
CPC ........ *G10L 15/22* (2013.01); *G10L 2015/223* (2013.01)

(58) Field of Classification Search
USPC .......................... 704/246, 247, 251, 252, 275
See application file for complete search history.

(56) References Cited

U.S. PATENT DOCUMENTS

| | | | |
|---|---|---|---|
| 10,924,599 B1 * | 2/2021 | Graham | H04M 3/42204 |
| 10,949,228 B1 * | 3/2021 | Graham | H04M 1/72403 |
| 11,145,289 B1 * | 10/2021 | Graham | G10L 13/08 |
| 2015/0163345 A1 * | 6/2015 | Cornaby | G06F 3/002 |
| | | | 345/633 |
| 2015/0187369 A1 * | 7/2015 | Dadu | G06F 3/165 |
| | | | 704/275 |
| 2016/0103652 A1 * | 4/2016 | Kuniansky | H04L 65/00 |
| | | | 700/94 |
| 2016/0180307 A1 | 6/2016 | Laracey | |
| 2019/0073663 A1 | 3/2019 | Jamkhedkar | |
| 2019/0311720 A1 * | 10/2019 | Pasko | G06F 3/167 |
| 2020/0143346 A1 | 5/2020 | Mossoba | |
| 2020/0175483 A1 | 6/2020 | Phillips | |
| 2020/0382486 A1 | 12/2020 | Dunjic | |
| 2021/0272564 A1 * | 9/2021 | Kamada | G10L 17/24 |

OTHER PUBLICATIONS

Non-Final Office Action mailed Dec. 14, 2021 for U.S. Appl. No. 16/928,060.
Final Office Action mailed Jul. 13, 2022 for U.S. Appl. No. 16/928,060.
Final Office Action mailed Jul. 10, 2023 for U.S. Appl. No. 16/928,060.

* cited by examiner

*Primary Examiner* — Leonard Saint-Cyr
(74) *Attorney, Agent, or Firm* — Plumsea Law Group, LLC

(57) ABSTRACT
A system and method for enabling trust with a servicing device allows a user to authorize a service using a user device, such as a mobile phone, which is in communication with the servicing device. The servicing device could be a smart speaker with an intelligent voice system that can retrieve user content directly from the user device.

20 Claims, 10 Drawing Sheets

7/7

900

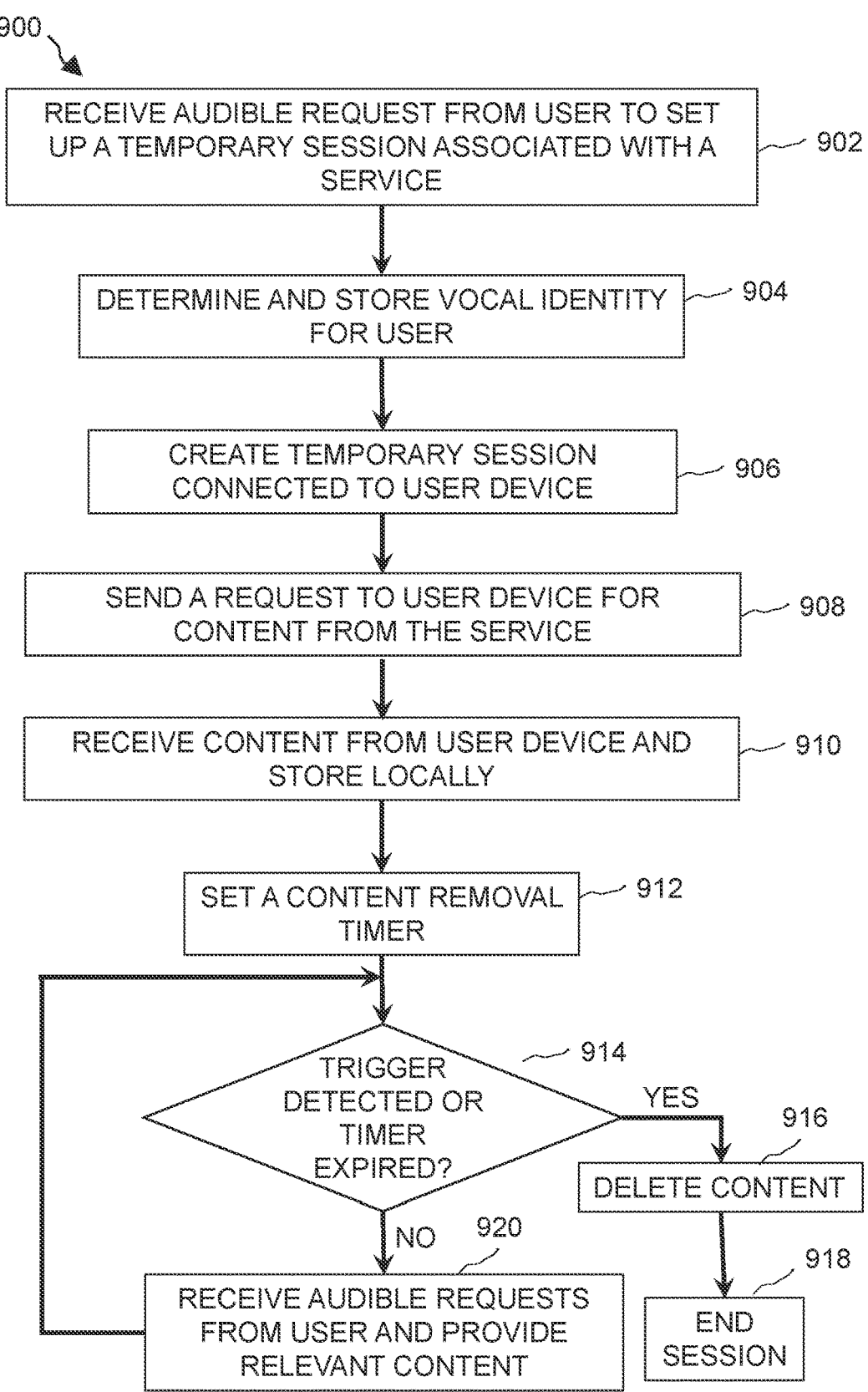

RECEIVE AUDIBLE REQUEST FROM USER TO SET UP A TEMPORARY SESSION ASSOCIATED WITH A SERVICE — 902

DETERMINE AND STORE VOCAL IDENTITY FOR USER — 904

CREATE TEMPORARY SESSION CONNECTED TO USER DEVICE — 906

SEND A REQUEST TO USER DEVICE FOR CONTENT FROM THE SERVICE — 908

RECEIVE CONTENT FROM USER DEVICE AND STORE LOCALLY — 910

SET A CONTENT REMOVAL TIMER — 912

TRIGGER DETECTED OR TIMER EXPIRED? — 914

YES    916

DELETE CONTENT

NO    920

RECEIVE AUDIBLE REQUESTS FROM USER AND PROVIDE RELEVANT CONTENT

918

END SESSION

FIG. 9

DEVICE WITH INTELLIGENT VOICE SYSTEM FOR TEMPORARY MANAGEMENT OF CONTENT

CROSS-REFERENCE TO RELATED APPLICATIONS

This application claims priority to U.S. patent application Ser. No. 16/928,060, filed Jul. 14, 2020, and titled "System and Method for Establishing Trust with a Device to Facilitate User Requests," which is incorporated by reference herein in its entirety, and which application claims the benefit of Provisional Patent Application No. 62/878,836 filed Jul. 26, 2019, and titled "System and Method for Establishing Trust with a Device to Facilitate User Requests," which is incorporated by reference herein in its entirety.

TECHNICAL FIELD

The present disclosure generally relates to devices with intelligent voice systems, and in particular to a system and method for managing content using the devices.

BACKGROUND

Internet of Things devices and other networked computing systems require connectivity to establish trust and resolve security issues in order to facilitate various requests from users. Issues such as limited or unreliable connectivity, latency introduced by calls to distant backend services, and inefficient uses of computing resources pose problems to establishing trust as well as fulfilling user requests.

There is a need in the art for a system and method that addresses the shortcomings discussed above.

SUMMARY

In some aspects, the techniques described herein relate to a smart speaker including an intelligent voice system, including: a processor; a non-transitory computer readable medium storing instructions that are executable by the processor to: receive an audible request from a user to set up a temporary session associated with a digital service; process, by the intelligent voice system, the audible request; establish communication with a user device associated with the user; create a temporary session with the user device for the digital service; automatically send a request, to the user device, for content information provided by the digital service; receive, from the user device, the requested content information provided by the digital service; store the requested content information in memory; receive a second audible request from the user; process, by the intelligent voice system, the second audible request; and audibly provide, by the intelligent voice system, at least some of the requested content information in response to the second audible user request.

In some aspects, the techniques described herein relate to a computer-implemented method, including: receiving an audible request from a user to set up a temporary session associated with a digital service; processing, by an intelligent voice system, the audible request; establishing communication with a user device associated with the user; creating a temporary session with the user device for the digital service; automatically sending a request, to the user device, for content information provided by the digital service; receiving, from the user device, the requested content information provided by the digital service; storing the requested content information in memory; receiving a second audible request from the user; processing, by the intelligent voice system, the second audible request; and audibly providing, by the intelligent voice system, at least some of the requested content information in response to the second audible user request.

In some aspects, the techniques described herein relate to a non-transitory computer-readable medium storing software including instructions executable by one or more computers which, upon such execution, cause the one or more computers to: receive an audible request from a user to set up a temporary session associated with a digital service; process, by an intelligent voice system, the audible request; establish communication with a user device associated with the user; create a temporary session with the user device for the digital service; automatically send a request, to the user device, for content information provided by the digital service; receive, from the user device, the requested content information provided by the digital service; store the requested content information in memory; receive a second audible request from the user; process, by the intelligent voice system, the second audible request; and audibly provide, by the intelligent voice system, at least some of the requested content information in response to the second audible user request.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 9 is a schematic view of a process for using an intelligent voice system to provide content to a user on a shared device, according to an embodiment.

DESCRIPTION OF THE EMBODIMENTS

The embodiments provide a system and method for enabling trust with a device to facilitate user requests. The device could be an ATM, a smart speaker, or any other kind of device that provides a service to a user. Such devices may be referred to as "servicing devices", as they are equipped to provide services to users. Servicing devices often require users to authenticate who they are in order to provide access to services such as withdrawing cash from an ATM, or listening to streaming music through a smart speaker. However, because these devices may be public or shared between multiple users that are not known to each other, users may not wish to provide authentication information to the servicing device for fear that the authentication information could be stolen by an unauthorized party. For example, a user at an ATM must trust that his or her bank card information and PIN number won't be stolen as this information is propagated from the ATM through the ATM network and to the bank's servers.

The exemplary system and method provide a way of establishing trust with a servicing device that leverages a user device, such as a mobile phone, to provide authentication and authorization for services. Specifically, the user device sends a user's credentials to a backend system to authenticate the user and to receive authorization for some request. This authorization is then transmitted to the servicing device, either through the user device, or directly from the backend system. As part of providing services to a user, the user device can also transfer account data to the servicing device, which may reside on the servicing device for a temporary period of time, after which it may be deleted. Because the user's credentials are not shared with the servicing device, the servicing device does not store any information that can be used by another party to gain unauthorized access to the user's account (for example, a bank account).

In addition to increasing trust with a servicing device that may be shared by multiple users, the exemplary system and method may also enable servicing devices to operate with limited and/or unreliable connectivity. This system can also reduce the latency of some services, by pre-loading data to the servicing device once a trusted connection is made, rather than having the servicing device make continuous calls to a backend service. This ability to pre-load data may be enabled by using devices with sufficient computing resources, including increased memory and/or processing power as compared to systems that are expected to continuously be in communication with a backend system.

Figure 1:
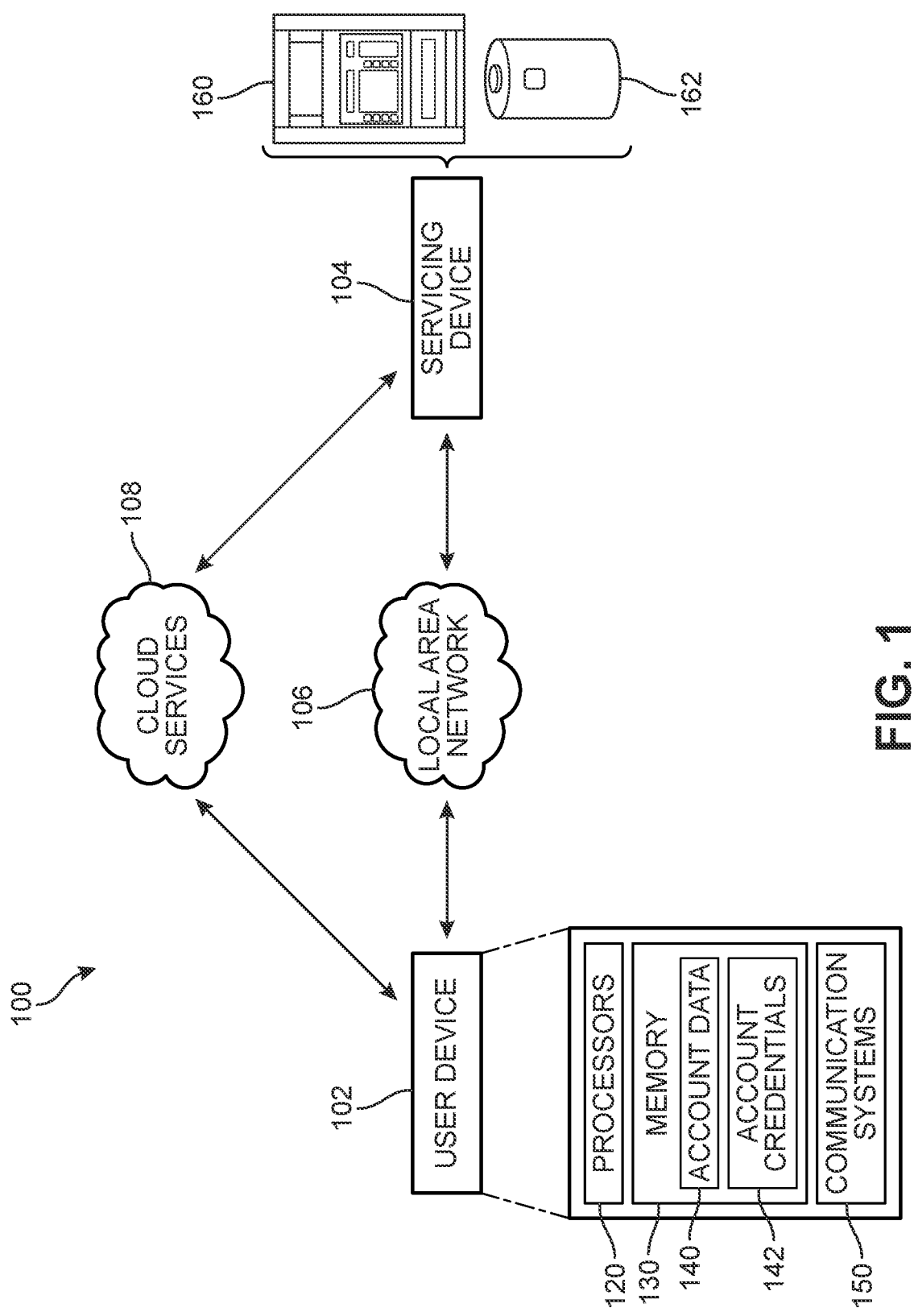
FIG. 1 is a schematic view of a trust-enabling network, according to an embodiment.

FIG. 1 is a schematic view of a trust-enabling network 100. Trust-enabling network 100 includes a user device 102 that communicates with a servicing device 104 over a local area network (LAN) 106. Optionally, one or both components may communicate with one or more cloud services 108.

User device 102 may comprise any kind of computing device that can be carried by a user. Examples of computing devices include, but are not limited to: laptops, mobile phones, tablet computing devices, wearable devices (such as smartwatches), as well as other suitable computing devices. A user device may also be referred to as a mobile device, as it is understood that the device can be moved and brought into proximity with the servicing device.

User device 102 may further include one or more processors 120 and memory 130. Memory 130 may comprise a non-transitory computer readable medium. Instructions stored within memory 130 may be executed by the one or more processors 120.

User device 102 may also store user-specific account information. This account information may include various kinds of account data 140 and account credentials 142 associated with various services, such as financial services, streaming services, or other kinds of services. Account data 140 may include any data that has been retrieved. For example, if the account is a banking account, account data could include the balance of the account as well as a history of recent transactions. For streaming music services, the account data could include audio data as well as meta data such as playlists and favorite songs. Account credentials 142 includes any authentication information required to access the account. These may include a username, password, or other means of authentication.

User device 102 can also include one or more communication systems 150. Communication systems may include any hardware and/or software that enable communication across one or more kinds of networks. Thus, communication systems 150 may include components and software that enable communication over WiFi networks, personal area networks (such as Bluetooth networks), cellular networks, as well as other kinds of networks.

As used herein, the term "servicing device" refers to a device that is configured to provide services. Examples of servicing devices include an automatic teller machine (ATM) 160 and a smart speaker 162. Another example of a servicing device is a smart TV, which could provide streaming video services to a user. Servicing devices could include various kinds of IoT devices, including devices that may be configured with user preferences through a backend service.

LAN 106 may comprise any kind of local network, including those types of networks commonly designated as personal area networks. Specifically, LAN 106 can include any network designed to operate over relatively short distances, within a range of approximately 10 to 20 meters, for example. In some cases, LAN 106 could be designed to operate within a range of no more than 1 to 2 meters.

Cloud services 108 may encompass any services, applications, or processes running on remote servers or other remote computing devices. These services, applications or processes are generally accessed over a wide area network (WAN), rather than over a local area network. Exemplary services include financial services, such as banking services, stock services, or other financial services. Other exemplary services include streaming services, such as streaming music services and streaming video services.

Figure 2:
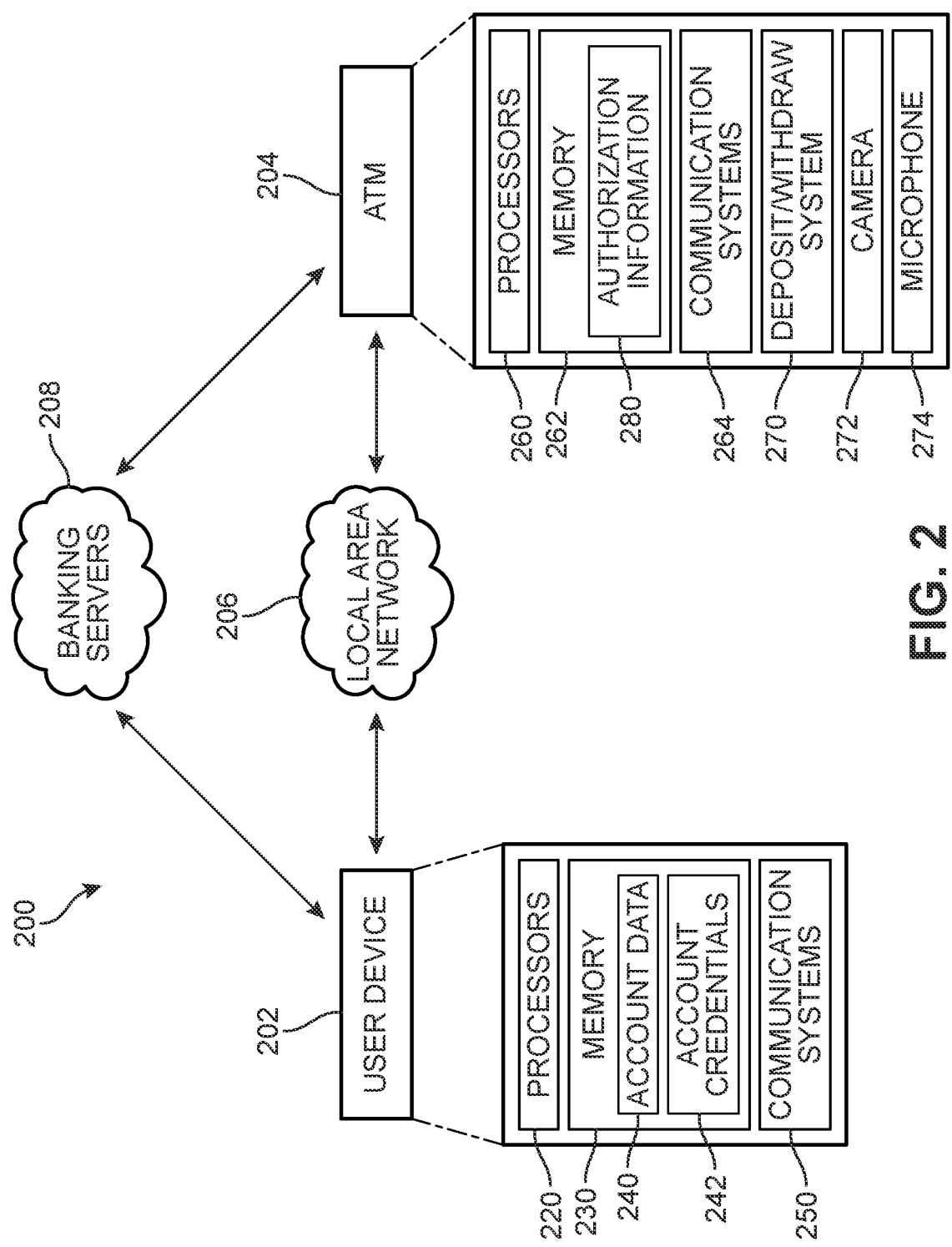
FIG. 2 is a schematic view of another embodiment of a trust-enabling network.

FIG. 2 is a schematic view of a particular trust-enabling network 200. Network 200 includes user device 202, including processors 220, memory 230, account data 240, account credentials 242, and communication systems 250.

Network 200 also includes an ATM 204. ATM 204 further includes its own processors 260 and member 262, as well as its own communication systems 264. Additionally, ATM 204 includes a deposit/withdraw system 270. Deposit/withdraw system 270 may comprise various components (including mechanical systems) that enable cash and/or checks to be deposited and withdrawn. These components may include a cash dispensing system and a system that can receive cash and/or checks. ATM 204 may also include security features, such as a camera 272 and a microphone 274. These security features may be used to provide additional levels of authentication, as described in further detail below.

ATM 204 may also be provided with other conventional features, such as a display screen, a keypad, and speakers. In some cases, ATM 204 could also include a slot for inserting a debit or other banking card.

ATM 204 may be configured to store various kinds of data. In some cases, ATM 204 can store authorization information 280, such as an authorization token. Although not indicated in FIG. 2, ATM 204 may also store video and/or audio information in memory for short period of time. Additionally, ATM 204 could store account data temporarily. For example, account data, such as a user's account balance, could be transferred to the ATM by user device 202 to be temporarily stored as the user interacts with the ATM.

User device 202 may communicate with ATM 204 using any suitable technology. In some cases, user device 202 may communicate with ATM 204 over a local area network 206. In some cases, user device 202 may communicate with ATM 204 using a personal area network, such as a Bluetooth network. In other cases, user device 202 may communicate with ATM 204 using a WiFi network, which could be housed and operated by ATM 204. In other cases, user device 202 may communicate with ATM 204 using NFC. In such cases, ATM 204 may include a surface with NFC enabled components. A user can then place user device 202 against this surface to enable an NFC connection.

User device 202 and/or ATM 204 may communicate with remote banking servers 208 over a wide area network, such as a cellular network. Banking servers 208 may include computing resources for storing and processing banking related information. For example, information about a user's checking account could be stored on banking servers 208. Banking servers 208 may also store account credentials, including a username and password (or password hash) that may be used to authenticate a user. To access this account information, a user may enter their account credentials into user device 202, which sends the credentials to banking servers 208 for authentication.

Figure 3:
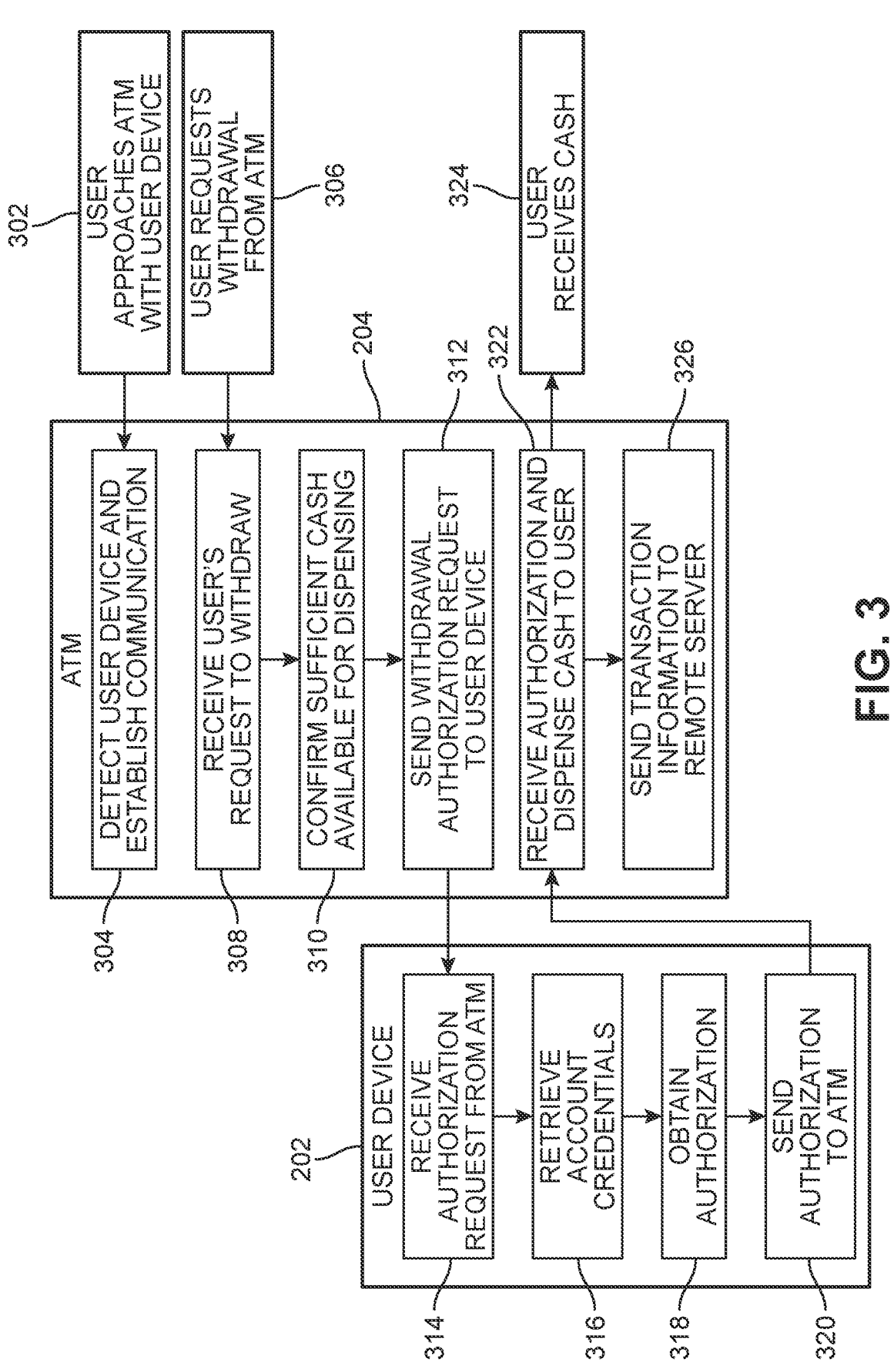
FIG. 3 is a schematic view of a process for enabling trust between a user device and an ATM to facilitate cash withdrawals.

FIG. 3 is a schematic view of a process whereby a user makes a cash withdrawal from an ATM using the trust-enabling network described above and shown in FIG. 2. For clarity, this example discusses the operation of the system when cash is withdrawn. However, it may be appreciated that a similar process could be used to enable deposits of both cash and checks.

The process begins at a step 302 when a user approaches ATM 204 with his or her user device 202. As the user approaches, ATM 204 may automatically detect the user device and establish communication in step 304. For example, ATM 204 may monitor a local area network and detect new devices that are accessing the network. ATM 204 may then establish a connection with user device 202 based on some previously established protocol. Such a protocol could be facilitated by a mobile application running on user device 202. For example, a bank operating ATM 204 could ensure that ATM 204 only connects with devices running a particular mobile banking application.

Next, in step 306, the user may request a withdrawal from the ATM. This request could be made using a keypad and/or touch-based display on the ATM itself, or through a mobile banking application on the user's device. In the latter case, the application can send the withdrawal request to the ATM over the connection established in step 304.

In step 308, ATM 204 receives the user's request to withdraw money. Upon receiving this request, and before confirming that the user is authorized to withdraw money, ATM 204 may confirm that there is sufficient cash available for dispensing to the user in step 310. If there is sufficient cash, ATM 204 proceeds to step 312, where ATM 204 sends a withdrawal authorization request to user device 202.

This request is received by user device 202 in step 314. In step 316, user device 202 (or more specifically, an application running on user device 202) retrieves the user's account credentials. This can include account credentials for accessing a user's account on remote servers (such as banking servers 208).

In step 318, user device 202 obtains authorization to withdraw funds from the ATM. In some cases, authorization may be obtained from the bank's servers (for example, banking servers 208). That is, using the account credentials, user device 202 can authenticate the user and request an authorization to withdraw cash from the ATM. However, it may also be possible to enable the user device itself to authorize transactions in some circumstances. For example, a system could be configured to authorize small one-time transactions locally (that is, from the device itself rather than from the servers). Such local authorizations may enable a user to withdraw cash from an ATM even if there is a brief disruption in connectivity with the bank's servers.

Figure 8:
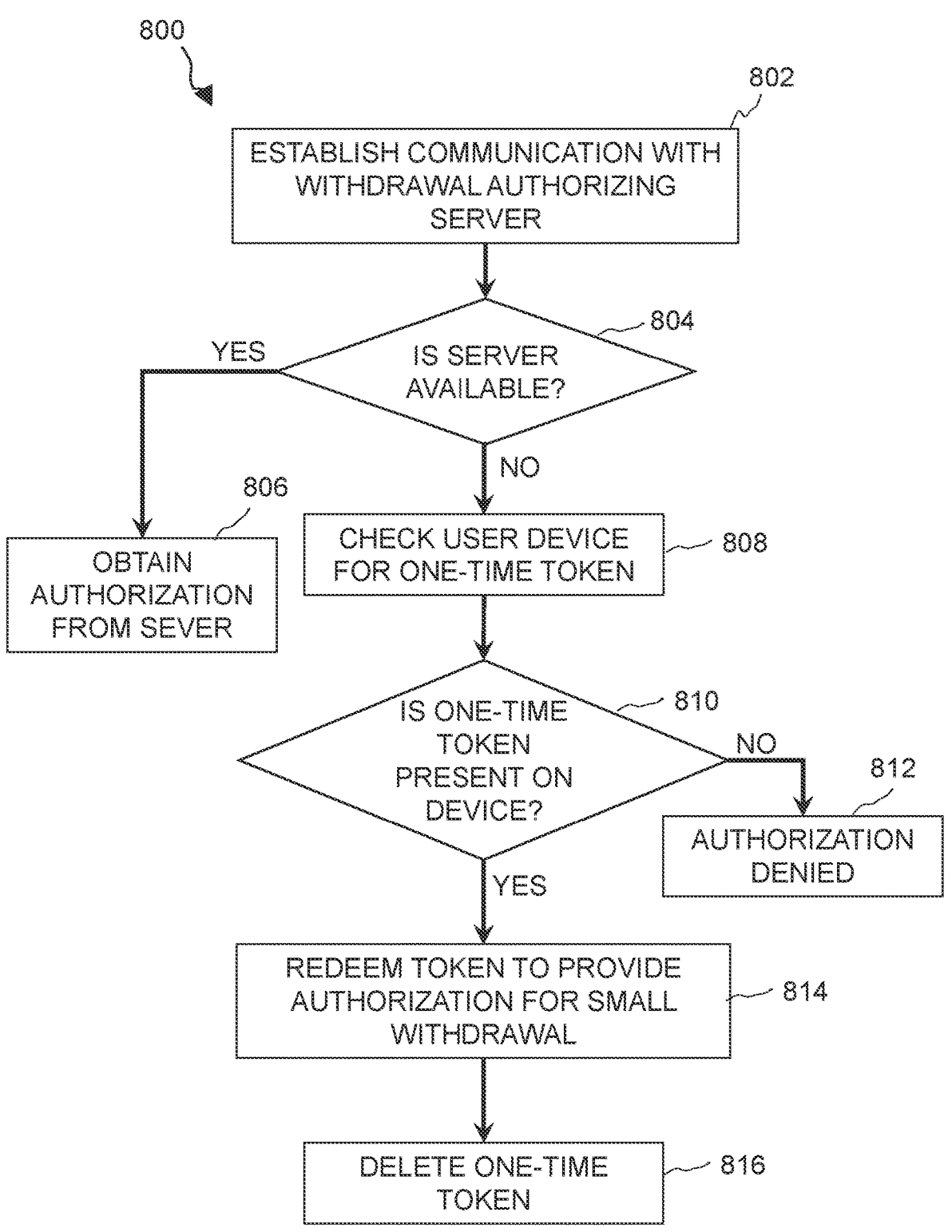
FIG. 8 is a schematic view of a process for using a one-time token to authorize an ATM transaction, according to an embodiment.

An exemplary method for allowing customers of a bank to obtain small withdrawals in the case of a disruption in connectivity with the bank's servers is shown in FIG. 8. Referring to FIG. 8, process 800 begins with step 802, where a user device may attempt to communicate with a withdrawal authorizing server. In some embodiments, the withdrawal authorizing server could comprise one of banking servers 208 that are shown in FIG. 2. In step 804, the system checks to see if the server is available. If the server is available, authorization for the requested withdrawal may be obtained directly from the server, as in step 806, and then provided to the ATM as already described.

However, in some cases, the server may be unavailable due to issues in connectivity, or may be unresponsive to the user device for other reasons. When the server is unavailable, the process continues to step 808 where the user device checks for a one-time token that may be stored in local memory (that is, the token is stored on the user device). This one-time token may be any suitable digital token and represents a one-time authorization for a small withdrawal, for example, a withdrawal amount in a range of $50 to $100 dollars.

In step 810, the user device determines if the one-time token is present. If not, the process continues to step 812 where the authorization for the withdrawal is denied. If, however, the user device determines that a one-time token is present in step 810, the process continues to step 814. In step 814, the user device may redeem the one-time token to provide authorization for a small withdrawal. In some cases, the token is provided directly to the ATM as proof of authorization for this one-time small withdrawal. The ATM may store information that can be used to confirm that the one-time token is valid so that the ATM can dispense the small withdrawal to the user.

After the one-time token has been redeemed, the process continues to step 816, wherein the one-time token is deleted. This ensures that the user cannot continue to withdrawal small amounts of money throughout the duration of the disruption in connectivity with the authorizing server.

Allowing users to make small withdrawals even while there is a disruption in communication with a bank's servers may be useful for banking customers during situations such as catastrophic events (for example, hurricanes, fires, or floods). During catastrophic events widespread connectivity issues may occur. In the aftermath of a catastrophic event, customers of a bank may have an increased urgency to obtain small amounts of cash that can be used to purchase food, water, and other emergency supplies. Using the exemplary method of FIG. 8, a bank can designate a small pool of funds for use in emergency situations and can opt to settle the cash balance with a user's account after connectivity with the bank's servers has been restored.

After authorization has been obtained, the authorization information is then sent to ATM 204 in step 320. As used herein, the term "authorization information" refers to any information that can be used to indicate that a particular transaction has been authorized by an authorizing party. In some cases, authorization information could include an authorization token that is known to both the user device and the ATM.

In step 322, ATM 204 receives the authorization and dispenses cash to the user (who receives the cash in step 324). In step 326, ATM 204 may send information about the transaction to a remote server (such as banking servers 208). In some cases, transaction information can be sent immediately, provided that ATM 204 has sufficient network connectivity to communicate with the servers. In other cases, transaction information could be sent in batches, for example, at the end of the day.

Figure 4:
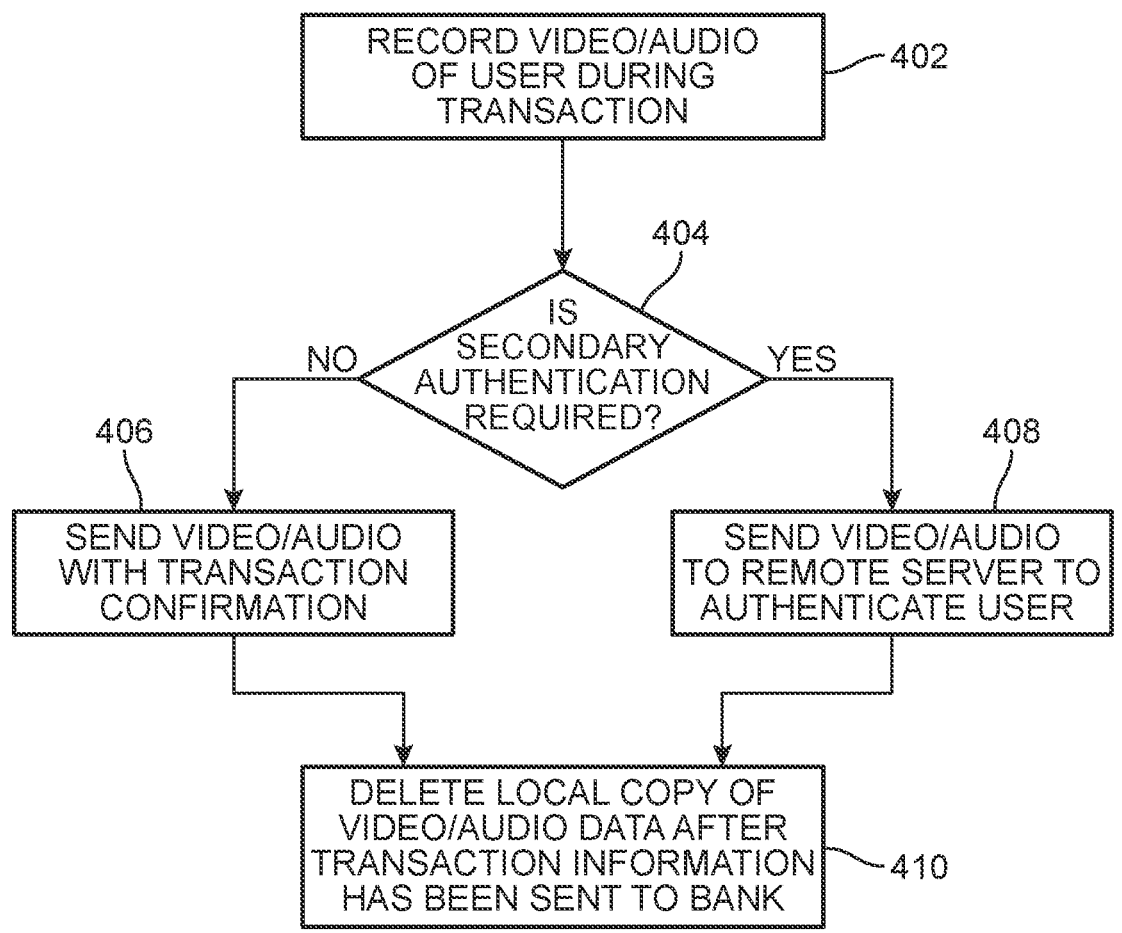
FIG. 4 is a schematic view of a process for providing additional authentication during cash withdrawals, according to an embodiment.

FIG. 4 is a schematic process for providing a secondary form of authentication for withdrawals. In this case, an ATM (for example, ATM 204) may use recorded video and/or audio to confirm the identity of the user. In a first step 402, an ATM may record video and/or audio of user's who are located in front of the ATM. Next, in step 404, the ATM checks to see if secondary authentication for a given transaction type is required. If not, the ATM may send the video/audio with the transaction confirmation (that is, after the transaction has occurred) to the banking servers in step 406. In this case, the video and/or audio are not used to authenticate the user's identity before processing the transaction, but only as a check after the transaction has occurred to confirm that the transaction was not fraudulent.

If secondary authentication is required, the ATM may send the audio and/or video information to the banking servers in step 408. The authentication step may then be done by the banking servers, rather than locally at the ATM. This prevents the ATM from having to retrieve user identifying information to compare against the video and/or audio information, thereby reducing the risk that user identifying information could be hacked and stolen from the ATM.

Regardless of how any video and/or audio data are used, the local copies of this data could be deleted after transaction information has been sent to the banking servers in step 410. This ensures that the video and/or audio information associated with user is only stored temporarily, thereby reducing the chances that this information could be stolen. Moreover, because no authentication/identification information is stored at the ATM, the audio and video data may not be useful in the event that the ATM is hacked.

Figure 5:
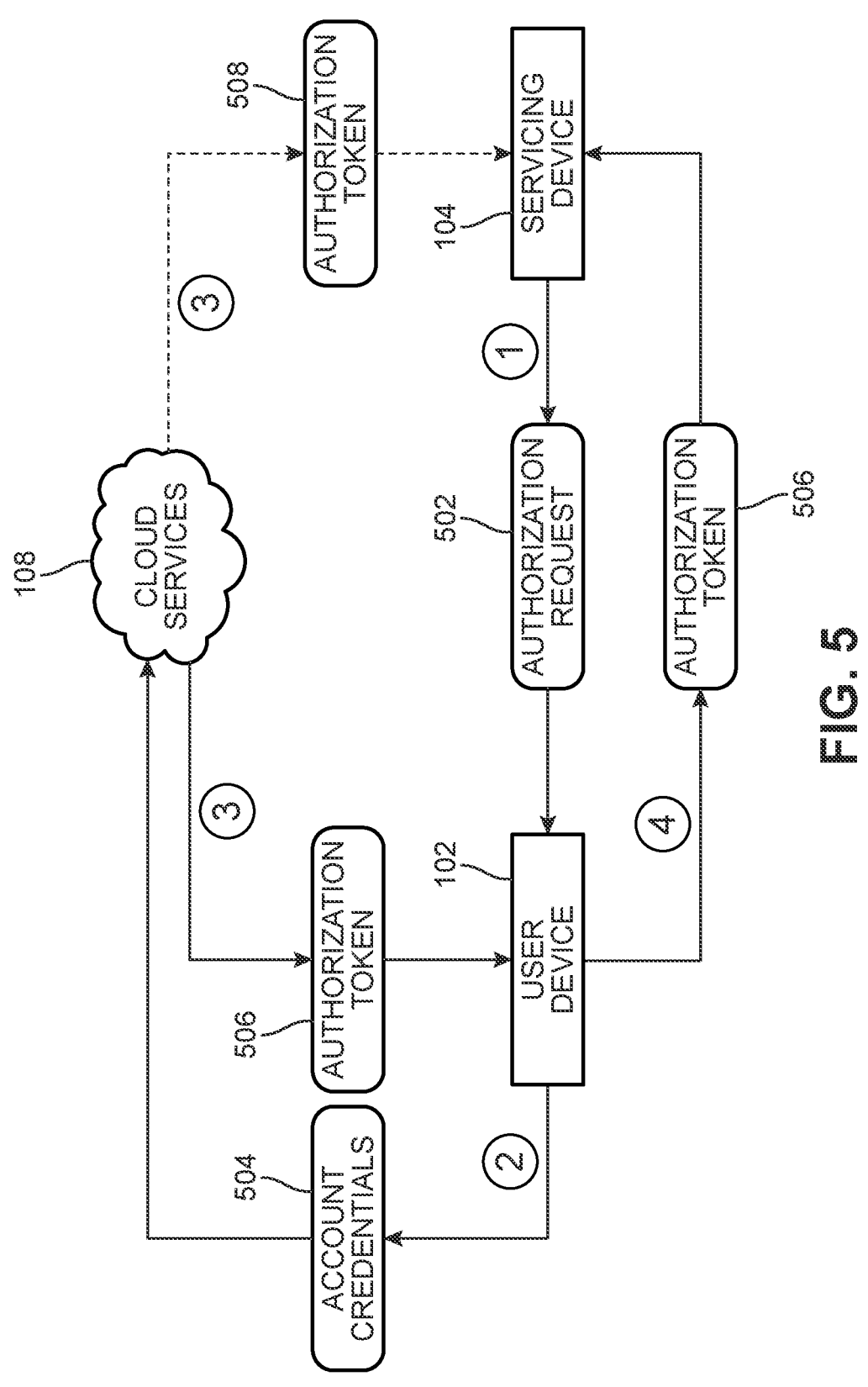
FIG. 5 is a schematic view of a process of providing authorization to a servicing device by way of a user device, according to an embodiment.

FIG. 5 is a schematic view of an exemplary process for obtaining authorization using a trust-enabled network, such as network 100 or network 200. The exemplary embodiment shown here is for network 100, including user device 102 and servicing device 104. However, this same process could be used with network 200, enabling authorization for banking withdrawals or other transactions between a user and an ATM. For clarity, the sequence of steps is labeled using the numbers 1, 2, 3 and 4.

This process begins with servicing device 104 sending an authorization request 502 to user device 102. That is, servicing device 104 needs to confirm that a user associated with user device 102 is authorized to access a particular service provided via servicing device 104 (such as having access to a cash withdrawal or a streaming music service). Next, user device 102 sends the user's account credentials 504 to cloud services 108. Account credentials 504 may include a username, password, biometric information, or any other information used to authenticate a user so that a given service can be authorized on their behalf. Upon authenticating the user, cloud services 108 may then confirm that the user is authorized for a given service. To indicate that the user is in fact authorized to receive a service, cloud services 108 may send an authorization token 506 to user device 102. User device 102 can then pass authorization token 506 back to servicing device 104. In some cases, cloud services 108 may send a matching authorization token 508 directly to servicing device 104 at the same time that authorization token 506 is sent to user device 102. In this case, servicing device 104 can compare the two authorization tokens to confirm that proper authorization has been received. Alternatively, in other embodiments, servicing device 104 may retrieve previously stored tokens (or hashes of tokens) to be compared with tokens received from user device 102. In such embodiments, a duplicate authorization token 508 may not be sent to servicing device 104, thereby allowing this process to occur even when servicing device 104 does not have connectivity with cloud services 108.

The exemplary embodiment depicted in FIGS. 2-5 may be seen to enable trust with an ATM, even when the ATM has limited or no connectivity. This is achieved by leveraging the connectivity of the user's device to obtain authorization for withdrawals, deposits, or other user requests, and pass that authorization to the ATM over a local area network (such as an NFC network or Bluetooth network). This system and method may also reduce the load on the ATM and the associated ATM network by reducing the number of calls made from the ATM to backend servers. This system further increases security for a user by limiting the number of parties that may have access to their account credentials or other information. Specifically, this method allows a user device to send credentials directly to backend servers over a secured connection through a cellular network (for example), rather than having that information sent by the ATM to one or more intermediaries before it eventually arrives at the bank's own servers.

Figure 6:
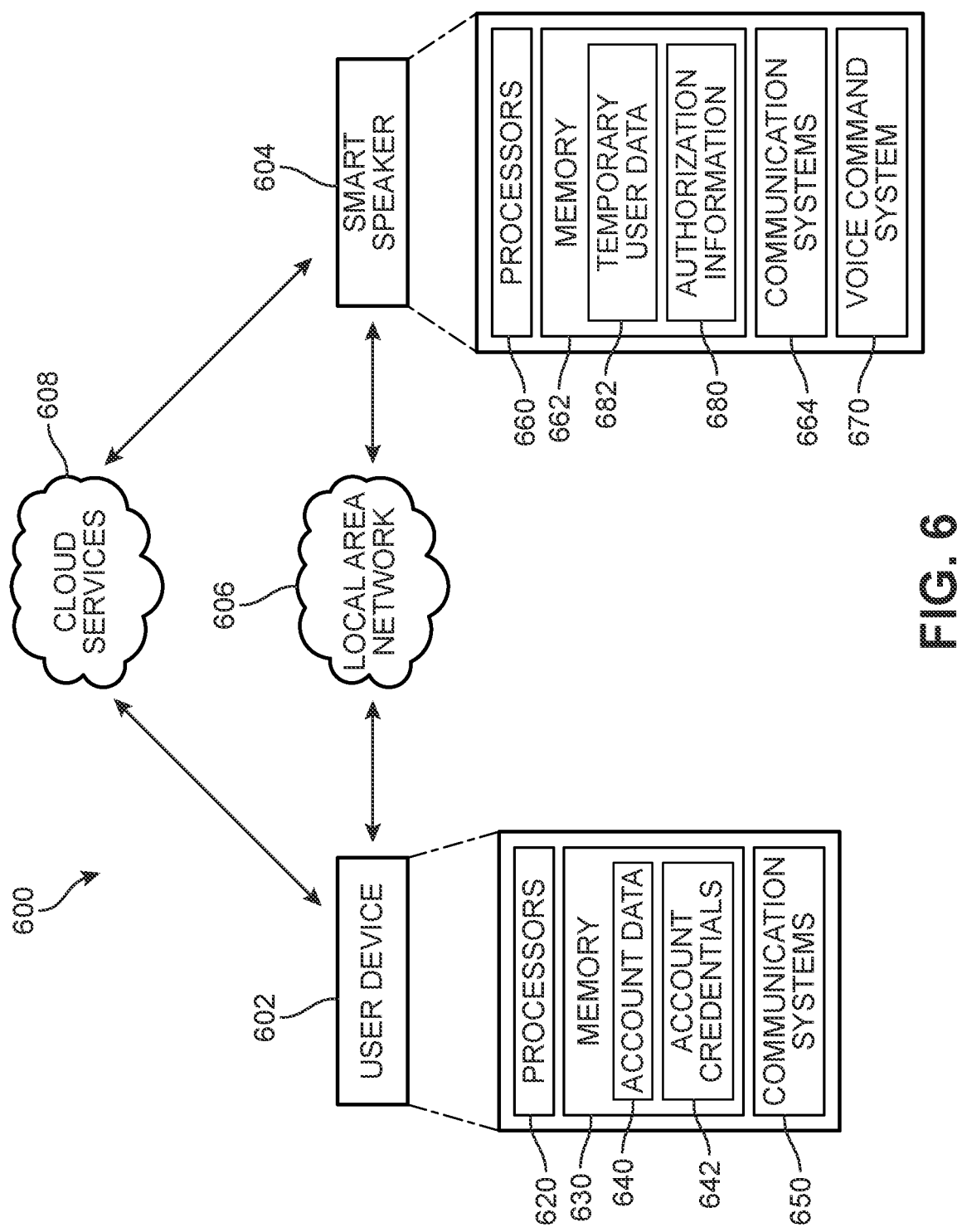
FIG. 6 is a schematic view of another embodiment of a trust-enabling network.

FIG. 6 is a schematic view of another embodiment of a trust-enabled network 600. In this example, network 600 includes user device 602 that communicates with a smart speaker 604 over a local area network 606. User device 602 further includes processors 620, memory 630, account data 640, account credentials 642, and communication systems 650.

In this case, the servicing device comprises smart speaker 604. Various smart speakers are known, and generally include intelligence for processing voice commands, communicating with remote servers, and providing audible responses to user queries. Smart speakers can also be used to play music over streaming services. To this end, smart speaker 604 further includes its own processors 660 and memory 662, as well as its own communication systems 664.

Smart speaker 604 can also include a voice command system 670 that facilitates detecting and generating speech. In some embodiments, voice command system 670 comprises an intelligent voice system, or intelligent voice assistant. The intelligent voice system may comprise an artificially intelligent system. The intelligent voice system may include functionality for receiving audible requests, processing the audible requests, taking automated actions in response to processing the audible requests, and responding audibly to users. Exemplary voice intelligent systems could leverage suitable Natural Language Processing (NLP) systems, as well as Large Language Models (LLMs).

Smart speaker 604 may be configured to store various kinds of data. In some cases, smart speaker 604 can store authorization information 680 (including authorization tokens). In some cases, smart speaker 604 could also be configured to store temporary account data 682, such as temporary credentials for one or more cloud services, or local copies of information retrieved from one or more user accounts.

User device 602 may communicate with smart speaker 604 using any suitable technology. In some cases, user device 602 and smart speaker 604 communicate over a local area network 606. In some cases, user device 602 may communicate with smart speaker 604 using a personal area network, such as a Bluetooth network. In other cases, user device 602 may communicate with smart speaker 604 using a WiFi network. Alternatively, these devices could communicate by NFC or any other suitable network.

User device 602 and/or smart speaker 604 may communicate with cloud services 608 over a wide area network, such as a cellular network. Exemplary cloud services that could be accessed include, but are not limited to: banking services, streaming music services, purchasing services, as well as other kinds of services.

Figure 7:
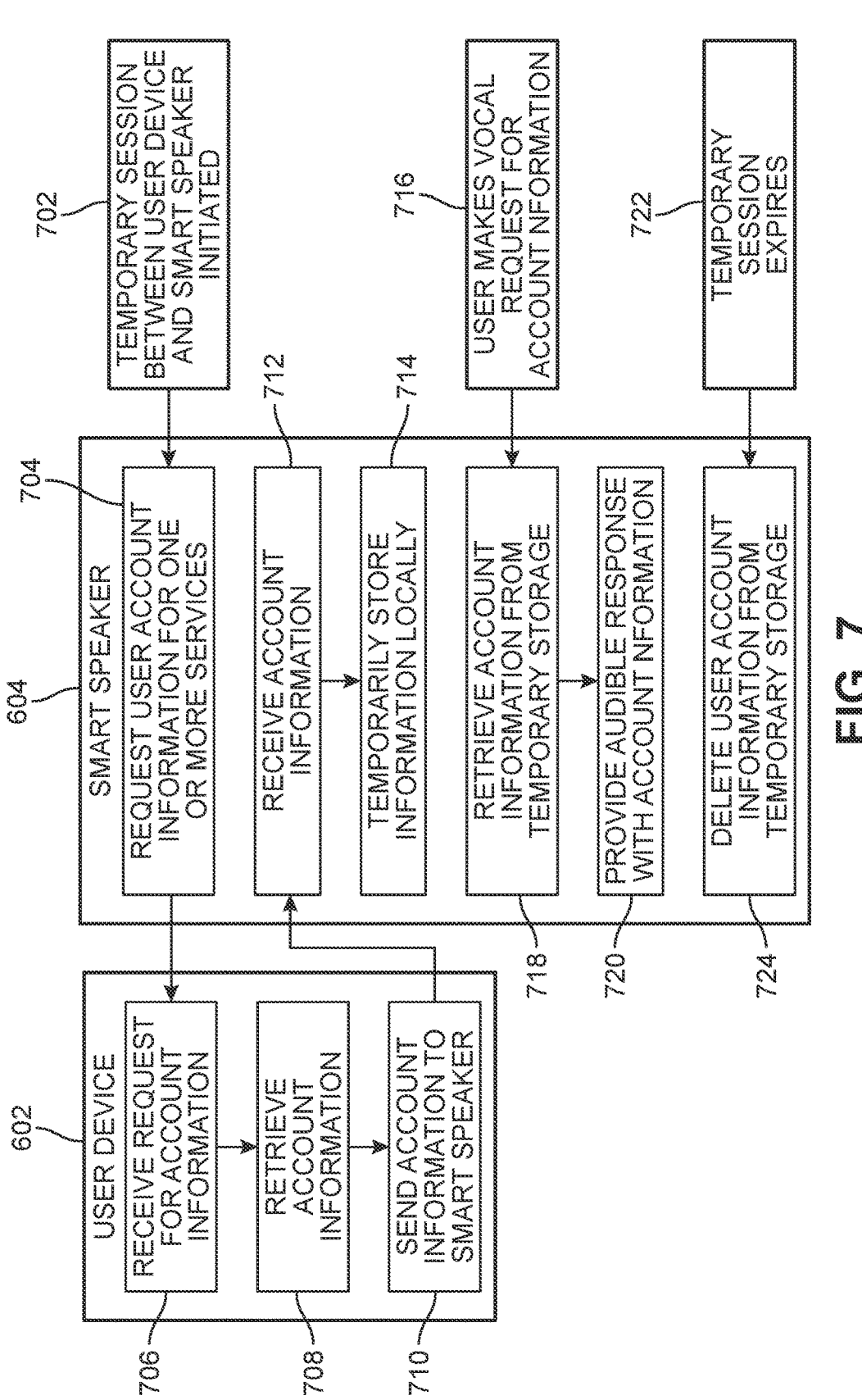
FIG. 7 is a schematic view of a process for enabling trust between a user device and a smart speaker to facilitate user requests.

FIG. 7 is a schematic view of a process whereby a user can check his or her banking account information by querying a smart speaker 604. To facilitate this process even when the smart speaker is a public device (for example, a smart speaker in a hotel room), the process leverages user device 602 to obtain the relevant account information, which may then be transmitted to, and temporarily stored on, smart speaker 604.

The process begins at step 702, when a temporary session between user device 602 and smart speaker 604 is initiated. In some cases, this session could be initiated when a user approaches the smart speaker with their device. In other cases, other triggers could be used to initiate a session. For example, when a user checks into a hotel room this could be a trigger to open a session between the devices and when the user checks out the session could be closed. This allows a (not necessarily continuous) session to be maintained through the entire time that the user is a guest in a hotel with a smart speaker.

With a session initiated, smart speaker 604 may request user account information (for example, account data 640) for one or more services from user device 602 in step 704. In this case, to limit the chance that the user's credentials for any account can be stolen by hacking smart speaker 604, account information may not include account credentials (or authenticating information). In step 706, user device 602 receives the request for account information. In step 708, user device 602 may retrieve the account information using the user's account credentials which are stored locally. In some cases, the account information may be retrieved by making a call to a remote server. Once the account information is retrieved from a remote server, user device 602 can send the account information to smart speaker 604 in step 710. Smart speaker 604 receives account information in step 712 and then temporarily stores the account information in step 714.

In step 716, a user may make an audible request to the smart speaker. For example, the user could ask about his or her account balance for a particular financial account. If that information has been previously gathered and stored locally, smart speaker 604 can retrieved the requested information (for example, an account balance) from temporary storage in step 718. In step 720, smart speaker 604 can provide an audible response with the requested account information.

In step 722, the temporary session expires. As soon as the session expires, any user account information is automatically deleted from temporary storage in step 724. This ensures that a user's account information is not stored on the smart speaker at a later time when the smart speaker is accessible by other users.

Although the exemplary process in FIG. 7 depicts a scenario where account data is requested immediately after a session has been opened, the account data could also be retrieved after the user makes a request. Moreover, the user could configure the session so that some data is pre-loaded into the smart speaker, while other data is only loaded as it is requested.

The process shown in FIG. 7 may be used for a variety of different services. For example, this process can be used to retrieve personalized account data, such as banking or other financial data, and provide that data in an audible form to a user in response to audible requests. This process can also be used to retrieve and play streaming music. For example, rather than allowing a smart speaker to have the user's credentials for a streaming music service, the user device can retrieve the music data (that is, the account data) and transfer the music data to the smart speaker to be played.

Alternatively, a smart speaker could also use an authorization process similar to the one described above and shown, for example, in FIG. 5, to stream audio directly even without access to a user's credentials. In this case, a user device could request authorization to access a streaming account via a public device, such as a smart speaker. The streaming service, upon authenticating the user (via credentials from the user device) could then send temporary credentials to the user device that could be passed back to the smart speaker. These temporary credentials, which may expire after a predetermined period, could be used by the smart speaker to stream music directly.

In some embodiments, the user account information can optionally include artificial intelligence skills. In these embodiments, skills that have either been developed over time on the user's home smart speaker (not shown) or skills that have been downloaded or purchased by the user, can be included as a portion of the user's account information. These skills can be stored locally on the user device 602 or stored in a remote server. In any case, these skills can be transferred to smart speaker 604 in a manner similar to the transfer of account information disclosed above, for example in steps 704 to 710. In this way, non-standard skills that the user is accustomed to but are not universally available, can be transferred to smart speaker 604. And considering multiple uses of this skill transfer feature, embodiments of the invention can provide a user with a consistent interactive experience as the user moves from one smart speaker to the next.

The exemplary system and method shown in the embodiment of FIGS. 6-7 may allow users to gain access to various services available through smart speakers without requiring the users to share their account credentials. Additionally, this system and method may enable the use of a smart speaker even when the smart speaker has limited or unreliable connectivity to various cloud services (such as streaming music services, financial services, etc.).

FIG. 9 is a schematic view of a process in which an intelligent voice system operating on a device, such as a smart speaker, may accommodate user requests for content from a digital service. In particular, the process leverages communication with a user device having authorization to access content from the digital service. The intelligent voice system obtains, via communication with the user device, the relevant account information, which may then be transmitted to, and temporarily stored on, the host device (such as a smart speaker).

Starting in step 902, an intelligent voice system receives an audible request from a user to set up a temporary session on the host device (such as a smart speaker) that is associated with a digital service. As one example, a user staying in a hotel room may audibly request that a smart speaker in the hotel room set up a temporary session for playing music from a streaming music service. As another example, a user staying at a friend's house could request that a smart speaker in the guest bedroom set up a temporary session for providing personal financial information (such as bank and stock account balances) from an online financial service (such as a bank, broker, or other service).

Next, in step 904, the intelligent voice system may determine and store vocal identity information for the user. The vocal identity information may be any suitable information that may be retrieved, or otherwise determined from, audible samples of the user's voice, and used as a biometric marker for identifying the user at a later time. Because the device may be a public device, or else a device accessible to other people besides the user setting up the temporary session, vocal identity information may be used to restrict access to content data stored locally, thereby enhancing trust with the user.

In step 906, the intelligent voice system may create a temporary session on the smart speaker that is associated with a user device that has already been authenticated with the requested service. For example, the user device could be a smartphone that is already authenticated with the digital service. In particular, the user may enter account credentials into an application running on the user device that authenticates the user and allows the user to, for example, stream music, receive financial account data, or access other content that is typically restricted to authenticated users.

When the temporary session is created on the smart speaker, the session may be associated with the specific user device. In some cases, the user device may be identified as part of the original request in step 902. For example, a user could say "set up a temporary session for playing music available from my phone." The intelligent voice system could then automatically attempt to connect to the user's phone over a suitable wireless connection. In some cases, the user may be required to grant permissions (at the user device) to the intelligent voice system and/or smart speaker.

In step 908, the intelligent voice system may send a request to the user device to obtain content from the selected service. In some cases, the intelligent voice system may automatically request particular content based on the type of service and possibly in response to specific user requests. For example, an intelligent voice system could automatically request content data associated with one or more playlists associated with a streaming music service. In some cases, songs on the user's most frequently listened to playlists on a music streaming service may be automatically downloaded, via the user device's connection to music streaming service, and stored in local memory on the host device. In some cases, financial data related to a user's financial accounts could be automatically downloaded, via the user device's connection to the financial service, and stored in local memory on the host device.

In step 910, the received content is stored locally in memory on the host device (such as a smart speaker).

In step 912, the intelligent voice system may set a content removal timer. A content removal timer determines a maximum amount of time that the content will be stored in local memory. The length of the timer could depend on the type of content, as well as user preferences that may be verbally stated to the intelligent voice system. For example, an intelligent voice system may set a relatively short content timer for financial data (such as twenty four hours) due to the sensitive nature of financial data and a relatively longer content timer for music data (such as one week). The length of the timer may also be determined by whether or not the device is public and/or how many other users may have access to the device. For example, the content timer could be shorter for publicly shared devices than for privately used devices. Similarly, the length of the content timer could be shorter as the number of potential users of the device increases, so that a content timer set for a device with many users (for example, more than five) could be relatively shorter than a content timer set for a device with few users (for example, fewer than five).

In step 914, the intelligent voice system may check for any triggers and/or to see if the content removal timer has expired. The triggers may be any suitable conditions under which the intelligent voice system automatically deletes content and/or closes the temporary session on the host device. In some embodiments, a trigger may include explicit requests to delete content or close a session from a user. In some embodiments, a trigger may include detecting requests from other users that do not match the vocal identity stored in memory, or detecting more than a threshold number of requests from other users. In an embodiment where the host device is a smart speaker in a hotel room, the trigger may include detecting that the user has checked out of the hotel room. In an embodiment where a host device is in a specific location that is different from a user's home or workplace, the trigger could include detecting via a virtual calendar that a user will no longer be present at the specific location (such as a hotel room) after a particular date.

If a trigger is detected or if the content removal timer expires, the content data stored in local memory on the device may be deleted in step 916. In step 918, the temporary session may be ended.

If no trigger is detected and the content removal timer has not expired, the intelligent voice system may receive audible requests from the user and provide the relevant content in response in step 920. For example, if a user requests a particular song that has already been downloaded to local memory, the intelligent voice system may automatically retrieve the song from memory and play it for the user. As another example, if the user requests his or her bank account balance, and this data is already stored locally, the intelligent voice system may retrieve the balance from memory and audibly provide it to the user.

In some situations, a user may request content that is not already stored in local memory. In such a situation, the intelligent voice system may make a further request to the user device for the additional content and store the additional content received from the user device in local memory.

Figure 10:
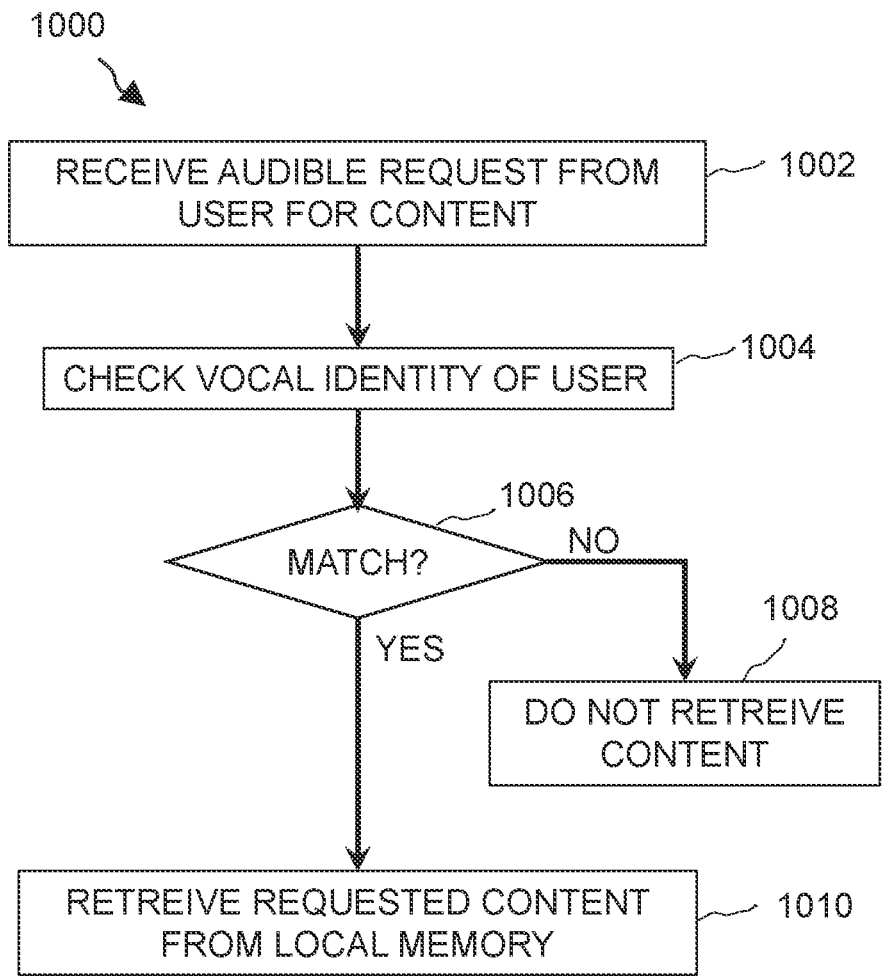
FIG. 10 is a schematic view of a process for confirming a vocal identity of a user, according to an embodiment.

FIG. 10 is a schematic view of a process 1000 for confirming the vocal identity of a user before processing and fulfilling a request for content so as to help protect the user's data, especially sensitive data. Starting in step 1002, the intelligent voice system receives an audible request for content from the user. In step 1004, the intelligent voice system checks the vocal identity of the user by comparing information from the most recent request with the vocal identity information stored in memory at the time that the temporary session was created. In step 1006, the intelligent voice system determines if the vocal identity of the current user matches the information stored in memory. If there is not a match, the intelligent voice system will not retrieve the content in step 1008. If there is a match, the intelligent voice system may retrieve the requested content from local memory in step 1010.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A smart speaker including an intelligent voice system, comprising:

a processor;

a non-transitory computer readable medium storing instructions that are executable by the processor to:

receive an audible request from a user to set up a temporary session between the smart speaker and a user device for accessing content from a digital service running on a remote system;

process, by the intelligent voice system, the audible request;

establish communication with the user device, wherein the user device stores account credentials for accessing the digital service;

create the temporary session with the user device for accessing content from the digital service;

automatically send a request, to the user device, for content information provided by the digital service, wherein the content information comprises data retrieved by the user device from the digital service running on the remote system using the account credentials stored on the user device;

receive, from the user device, requested content information provided by the digital service;

store the requested content information in memory of the smart speaker;

receive, from the user, a second audible request for at least some of the content information;

process, by the intelligent voice system, the second audible request; and audibly provide, by the intelligent voice system, at least some of the requested content information stored in the memory of the smart speaker in response to the second audible request without sending the second audible request to the user device.

2. The smart speaker according to claim 1, wherein the instructions are further executable by the processor to establish a vocal identity and to confirm the vocal identity of the user before processing the second audible request.

3. The smart speaker according to claim 1, wherein the instructions are further executable to detect a trigger and delete the requested content information from the memory upon detecting the trigger.

4. The smart speaker according to claim 3, wherein the trigger includes detecting a third audible request for content from someone other than the user.

5. The smart speaker according to claim 1, wherein the instructions are further executable to set a content removal timer and remove the requested content information from local memory when the content removal timer expires.

6. The smart speaker according to claim 1, wherein the digital service is an online streaming service that is accessible using the account credentials stored on the user device.

7. The smart speaker according to claim 6, wherein the requested content information includes digital music information that is stored in the memory of the smart speaker.

8. The smart speaker according to claim 1, wherein the digital service is an online banking service that is accessible using the account credentials stored on the user device.

9. The smart speaker according to claim 8, wherein the requested content information includes bank account information for the user that is stored in the memory of the smart speaker.

10. A computer-implemented method, comprising:

receiving an audible request from a user to set up a temporary session between a smart speaker and a user device for accessing content from a digital service running on a remote system;

processing, by an intelligent voice system, the audible request;

establishing communication with the user device, wherein the user device stores account credentials for accessing the digital service;

creating the temporary session with the user device for accessing content from the digital service;

automatically sending a request, to the user device, for content information provided by the digital service, wherein the content information comprises data retrieved by the user device from the digital service running on the remote system using the account credentials stored on the user device;

receiving, from the user device, requested content information provided by the digital service;

storing the requested content information in memory of the smart speaker;

receiving, from the user, a second audible request for at least some of the content information;

processing, by the intelligent voice system, the second audible request; and audibly providing, by the intelligent voice system, at least some of the requested content information stored in the memory of the smart speaker in response to the second audible request without sending the second audible request to the user device.

11. The computer-implemented method according to claim 10, wherein the method further includes establishing a vocal identity and confirming the vocal identity of the user before processing the second audible request.

12. The computer-implemented method according to claim 10, wherein the method further includes detecting a trigger and deleting the requested content information from the memory upon detecting the trigger.

13. The computer-implemented method according to claim 12, wherein detecting the trigger includes detecting a third audible request for content from someone other than the user.

14. The computer-implemented method according to claim 10, wherein the digital service is an online streaming service that is accessible using the account credentials stored on the user device.

15. The computer-implemented method according to claim 10, wherein the requested content information includes digital music information that is stored in the memory of the smart speaker.

16. The computer-implemented method according to claim 10, wherein the digital service is an online banking service that is accessible using the account credentials stored on the user device.

17. The computer-implemented method according to claim 10, wherein the requested content information includes bank account information for the user that is stored in the memory of the smart speaker.

18. The computer-implemented method according to claim 10, wherein the method further includes setting a content removal timer and removing the requested content information from local memory when the content removal timer expires.

19. A non-transitory computer-readable medium storing software comprising instructions executable by one or more computers which, upon such execution, cause the one or more computers to:

receive an audible request from a user to set up a temporary session between a smart speaker and a user device for accessing content from a digital service running on a remote system;

process, by an intelligent voice system, the audible request;

establish communication with the user device, wherein the user device stores account credentials for accessing the digital service;

create the temporary session with the user device for accessing content from the digital service;

automatically send a request, to the user device, for content information provided by the digital service, wherein the content information comprises data retrieved by the user device from the digital service running on the remote system using the account credentials stored on the user device;

receive, from the user device, requested content information provided by the digital service;

store the requested content information in memory of a smart speaker;

receive, from the user, a second audible request for at least some of the content information;

process, by the intelligent voice system, the second audible request; and audibly provide, by the intelligent voice system, at least some of the requested content information stored in the memory of the smart speaker in response to the second audible request without sending the second audible request to the user device.

20. The non-transitory computer-readable medium according to claim 19, wherein the instructions are further executable to cause the one or more computers to establish a vocal identity and to confirm the vocal identity of the user before processing the second audible request.

\* \* \* \* \*